Patented Feb. 11, 1941

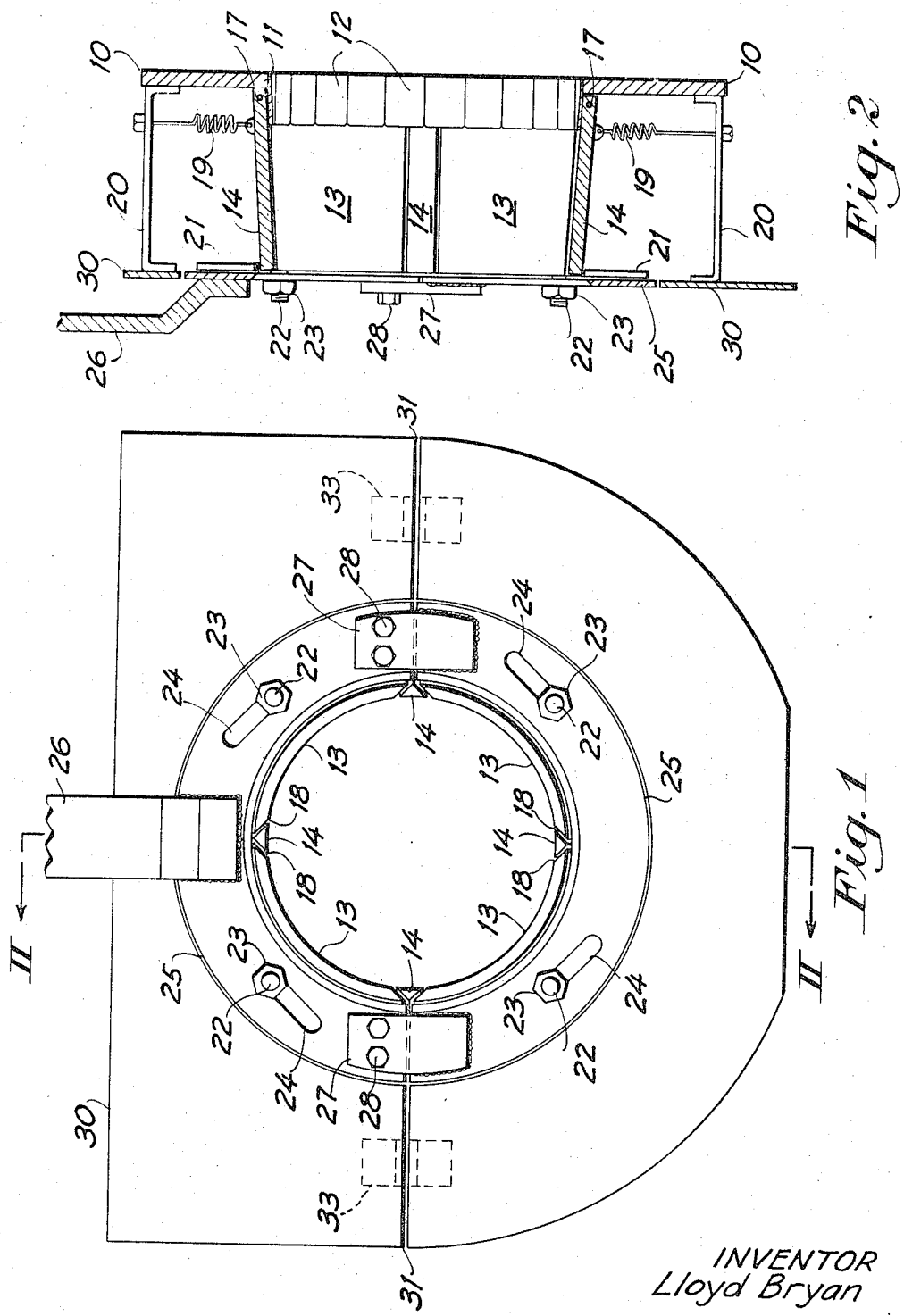

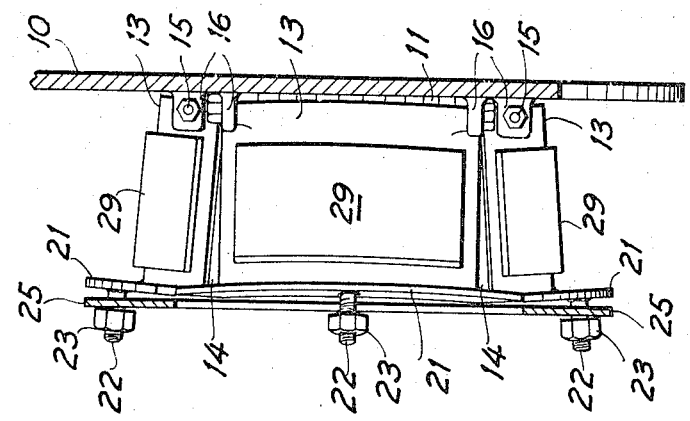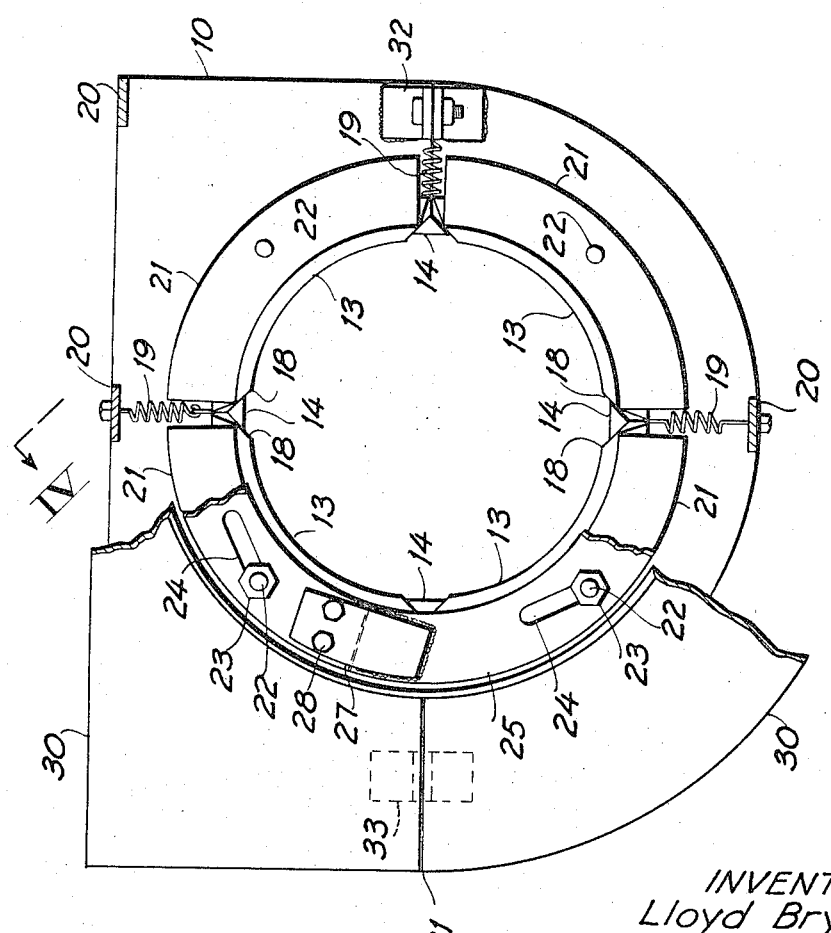

2,231,250

UNITED STATES PATENT OFFICE 2,231,250

EXPANDING NOZZLE FOR COATING PIPE BY EXTRUSION

Lloyd Bryan, Los Angeles, Calif., assignor to Standard Oil Company of California, San Francisco, Calif., a corporation of Delaware Application February 11, 1939, Serial No. 255,879

14 Claims. (Cl. 25—38)

This invention relates to pipe coating apparatus which is adapted to apply a relatively thick coating of dense, plastic material, such as a bituminous mastic, to the outer surface of a pipe, and particularly refers to a nozzle construction adapted to be moved along a pipe line of considerable length which is temporarily raised above the surface of the earth and is intended to be buried in a trench after coating, the successive sections of said pipe line being joined by couplings which are somewhat larger in diameter than the pipe. This invention is an improvement over the apparatus disclosed and claimed in a co-pending joint application with William R. Postlewaite, Serial No. 236,410, filed October 22, 1938, which issued January 9, 1940, as United States Patent No. 2,186,361.

In that application apparatus is shown for continuously extruding a plastic coating, which may be a bituminous mastic of the type described in United States Patent No. 1,984,649, issued December 18, 1934, to C. S. McDonald et al. That apparatus includes a power-driven tractor unit adapted to propel itself along the pipe line to be coated, and to move a hollow die or nozzle surrounding the pipe and spaced therefrom to form an annular orifice through which the plastic material, urged into the chamber of the nozzle by a suitable pump, may be extruded to form a continuous, seamless coating on the pipe. In that apparatus the diameter of the nozzle outlet is fixed so that when a coupling or enlargement in the pipe passes through the opening, the coating formed thereon will be thinner than that on the pipe and ordinarily requires patching or further manual application of plastic material to form an adequate coating. The nozzle structure there shown comprises a front plate and a back plate, joined by a U-shaped member to form a chamber. The outlet, or back plate, includes an inwardly tapering or conical nozzle adapted to guide the plastic material into direct contact with the pipe and to determine the outer diameter of the coating thus formed.

This invention relates primarily to a modification of the back plate, or outlet plate, of an extrusion nozzle of the type just described, and particularly to an arrangement in which the members forming the conical or inwardly tapered bore of the nozzle are adapted to be expanded to form a larger diameter coating over a desired section of pipe line, such as a threaded coupling or other enlargement, and then to be contracted to the diameter of the normal thickness of the coating over the pipe.

The advantages of a controllable diameter of nozzle will be obvious to one skilled in this art, as it will permit the coating of a continuous pipe line to a thickness of one-half inch, for example, and, when a threaded coupling which increases the pipe diameter by aproximately three-fourths inch is encountered, the nozzle may be expanded or enlarged to permit an adequate and finished coating over the coupling. After the coupling is passed, the diameter may be reduced to that suitable for the pipe itself.

It is an object of this invention to provide an outlet plate or member for an extrusion type of pipe coating apparatus with which are associated a plurality of segments of a generally conical nozzle which may be expanded or contracted by the operator to modify the diameter of the discharge end of the nozzle so formed.

Another object is to provide a radially expanding nozzle structure in wihch leakage of plastic material outwardly between the longitudinally separate segments comprising the nozzle is effectively prevented at all positions of the latter.

Another object is to provide an expanding nozzle for an extrusion type pipe coating machine, which is separable along its center axis so that it may be placed around a pipe without disconnecting the latter.

These and other objects and advantages will be more fully apparent from the following description and from the drawings which form a part of this specification and illustrate a preferred embodiment of the invention. Although the arrangement shown is particularly adapted to be used with the extrusion type pipe coating apparatus disclosed and claimed in my co-pending application. Serial No. 236,410, it is obvious that it would also be applicable to other types of equipment for this purpose.

In the drawings Fig. 1 is an end elevational view of the discharge or outlet side of a nozzle constructed according to this invention, this nozzle being in its closed or contracted position.

Fig. 2 is a vertical sectional view on line II—II of the apparatus shown in Fig. 1.

Fig. 3 is an end elevational view, partly in section, of the apparatus of Fig. 1, with the nozzle segments in their expanded or opened position.

Fig. 4 is a vertical sectional view on line IV—IV of Fig. 3, showing a preferred hinged arrangement of the segments comprising the nozzle.

Referring to the drawings, reference numeral 10 designates a back plate which may form the outlet side of an annular chamber adapted to surround a pipe onto which plastic material is to be extruded. The type of extrusion chamber is immaterial, but may be that of my co-pending application cited above. A central opening 11, in back plate 10, is provided with a plurality of flat or curved spring members 12, which extend inwardly for a short distance from the face of plate 10 and form a seal for the inner ends of the longitudinal segments comprising the conical or inwardly tapered outlet nozzle. In this example these segments are of unequal width, the wider being designated 13 and the narrow or sealing segments being designated 14.

In the drawing (Fig. 4), the wide segments 13 are illustrated as being hinged at 15 to lugs 16, which extend outwardly from the face of back plate 10. Referring to Fig. 2, the narrow or sealing segments are illustrated as being hinged by means of pins 17, which are received in suitable recesses in the edges of wide segments 13 near the inner end of the latter. Spring members 12, in opening 11, cover the joints between the inner ends of nozzle segments 13 and 14, and back plate 10, and prevent leakage of plastic material at this point.

Referring to Figs. 1 and 3, the contacting faces 18, between wide segments 13 and sealing segments 14, are tapered so that the latter, which are preferably widest on their inner faces and narrowest on their outer faces, will remain in contact with the wide ones substantially throughout their lengths as both sets of segments are swung outwardly about their respective hinges 15 and 17 when the nozzle is expanded. The wide segments 13 are positively controlled by means which will be described below, and the narrow segments 14 are preferably urged outwardly by resilient means, such as springs 19, secured to spacing means 20.

The outer end of each wide segment 13 is preferably provided with a radial flange 21 (Figs. 3 and 4), in the outer face of which is a stud or pin 22, which may be threaded to receive a nut 23. In this example the four studs 22 on flanges 21 extend through corresponding slots 24 in a ring 25, the latter adapted to be rotated through a small angle by a handle 26. Ring 25 is preferably made in two halves so that it may be separated on the axis of the nozzle and is secured together by splice plates 27 and screws 28.

Slots 24, in ring 25, are preferably tangent to the circle described by studs 22 when the segments 13 and 14 are in their contracted or closed position shown in Fig. 1. In other words, one end of each of slots 24 is at a greater distance from the longitudinal axis of the nozzle, and the pipe being coated, than the other end of the same slot. Thus, when ring 25 is rotated in a clockwise direction relative to segments 13 and 14 by means of handle 26, studs 22 will be moved radially outwardly, expanding the outer end of the nozzle by drawing apart that end of segments 13. The narrow segments 14 will be urged by springs 19 to follow the wide segments 13 to a position illustrated in Fig. 3. The complementary tapered contacting faces 18, of segments 13 and 14, will remain in contact and will prevent leakage outwardly of the plastic material which is being passed through the nozzle. Preferably, the largest diameter to which the outer ends of segments 13 and 14 will expand should be smaller than the central opening 11, so that in its fully expanded position the bore of the nozzle formed by segments 13 and 14 will be tapered inwardly to compact the plastic material about the pipe or other cylindrical object being coated.

When thermoplastic materials, such as bituminous mastic, are being applied with a nozzle of this type, it is ordinarily desirable to heat at least the wide segments 13 by means such as electric elements 29 supplied through flexible leads from any suitable electric power source. It is also desirable to provide a finish plate 30 spaced from back plate 10, to be substantially in the plane of ring 25, by means of spacing members 20. It is also contemplated that back plate 10 and finish plate 30 will be split as shown at 31, to facilitate placing around the pipe to be coated the two parts being secured together by means of splice brackets 32 and 33. If desired, a thin metal jacket, filled with a heat insulating material, may be used to enclose the entire nozzle. This has not been illustrated, for clarity of the drawing, but is conventional on apparatus of this type.

In operation, it is contemplated that the outer end of segments 13 and 14 will be contracted so that the bore thus formed will define the outer diameter of the coating to be applied to the pipe proper. When the device passes over a threaded coupling or similar enlargement in the pipe, handle 26 will be moved in a clockwise direction, expanding the outer ends of the segments 13 and 14 to the position shown in Fig. 3, so that an adequate thickness of coating material will be applied over the enlargement. After the enlargement has passed through the nozzle, handle 26 will be moved counter-clockwise to its original position, and the outlet of the nozzle formed by segments 13 and 14 will be contracted to the original thickness of the coating for the pipe.

In its expanded position, the arrangement shown will not provide a truly circular bore, but will leave slight ridges at the points where the narrow segments 14 expand outwardly to fit the tapered contacting faces of wide segments 13. This will not detract from the efficiency of the coating nor will it add any very great amount of unnecessary material, as such couplings form a very small proportion of the length of a pipe line.

The essential features of this invention appear to reside in a segmental nozzle or outlet for an extrusion machine for coating pipe and the like with plastic material, the longitudinal segments being hinged or pivoted at their inlet end to a fixed portion of the nozzle and arranged to be simultaneously and controllably moved radially inwardly and outwardly at their outer ends to form an outlet diameter of the desired dimension. A further feature consists in the provision of a plurality of narrow or sealing segments adapted to cooperate with the principal segments to seal the longitudinal openings between the latter when they are expanded to form the larger diameter outlet.

Although a specific construction of this device has been illustrated and described, it will be appreciated that many modifications and changes may be made in its various parts without departing from the invention, and all such changes that come within the scope of the appended claims are embraced thereby.

I claim:

1. A conical outlet nozzle for an extrusion type apparatus for coating pipe or the like with plastic material, comprising a fixed portion, a plurality of longitudinal segments pivotally secured at one end to the fixed portion, and means connecting the opposite ends of said segments simultaneously to swing them radially inwardly and outwardly to form an inwardly tapering nozzle having an outlet of the desired diameter.

2. An outlet nozzle according to claim 1, in which said segments are alternately wide and narrow around the circumference of said nozzle, said narrow segments tapering inwardly from their inner to their outer faces to form seals for the complementary tapered wide segments.

3. An outlet nozzle according to claim 1, in which said segments are alternately wide and narrow around the circumference of said nozzle, said narrow segments tapering inwardly from their inner to their outer faces to form seals for the complementary tapered wide segments, and resilient means for urging said narrow segments into the spaces between said wide segments.

4. An outlet nozzle according to claim 1, in which said last-named means comprises a rotatable ring, and means connecting said ring with at least a part of said segments to swing said segments radially inwardly when said ring is rotated in one direction, and to swing the said segments radially outwardly when said ring is rotated in the opposite direction.

5. An outlet nozzle according to claim 1, in which said last-named means comprises a member movable in a plane at right angles to the longitudinal axis of said nozzle, a plurality of inclined slots in said member, and means connecting at least a part of said segments with said slots to swing said segments radially inwardly when said member is moved in one direction, and to swing the said segments radially outwardly when said member is moved in the opposite direction.

6. A conical outlet nozzle for an extrusion type apparatus for coating pipe or the like with plastic material, comprising a member fixed to said apparatus and defining an outlet opening therefor, a plurality of longitudinal segments movably secured to said member adjacent said opening and extending outwardly therefrom to define an inwardly tapering nozzle, means connecting the outer ends of said segments simultaneously to move them radially inwardly and outwardly to form an outlet of the desired diameter, and sealing means in said opening of said first-named member overlapping the inner ends of said segments to prevent leakage of plastic material between said member and the inner end of said segments.

7. A conical outlet nozzle according to claim 6, in which said last-named sealing means comprises a plurality of substantially flat spring members extending outwardly axially from said opening in said first-named member and covering at least a part of the length of said segments.

8. A conical outlet nozzle for an extrusion type apparatus for coating cylindrical objects, such as pipe or the like, with plastic material, comprising a plate having an opening therein through which said cylindrical object may be moved relatively thereto, a plurality of longitudinal segments hinged at one end to said plate and surrounding said opening to form an inwardly tapered bore extending therefrom, the longitudinal joint between said segments being tapered to provide a seal for said plastic material, and means connecting the outer ends of at least part of said segments to swing them radially inwardly and outwardly to form an outlet of the desired dimension.

9. An outlet nozzle according to claim 8, in which said segments are alternately wide and narrow, the inner faces of said narrow segments being wider than the outer faces thereof; and resilient means for keeping said narrow segments in contact with said wide segments to seal the longitudinal spaces therebetween.

10. An outlet nozzle according to claim 8, in which said segments are alternately wide and narrow, said wide segments being hinged to said plate and said narrow segments being hinged to the inner ends of said wide segments, and in which said last-named means connect only said wide segments to swing their outer ends inwardly and outwardly to form an outlet of the desired dimensions.

11. An outlet nozzle for an extrusion type apparatus for coating pipe or the like with plastic material, comprising a fixed portion, a plurality of circumferentially overlapping longitudinal segments movably secured to the fixed portion and means for simultaneously moving said segments inwardly and outwardly to form a conical nozzle having an outlet of the desired diameter.

12. An outlet nozzle according to claim 11 in which said last named means are positively connected to at least some of said segments.

13. An outlet nozzle according to claim 11 in which said last named means are connected to alternate segments.

14. An outlet nozzle according to claim 11 with the addition of sealing means overlapping the joint between the fixed portion of said nozzle and the inner end of said movable segments.

LLOYD BRYAN.